(12) United States Patent
An

(10) Patent No.: US 12,024,008 B2
(45) Date of Patent: Jul. 2, 2024

(54) VEHICLE BODY STRUCTURE

(71) Applicants: Hyundai Motor Company, Seoul (KR); Kia Corporation, Seoul (KR)

(72) Inventor: Byeongdo An, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 17/643,332

(22) Filed: Dec. 8, 2021

(65) Prior Publication Data

US 2023/0042809 A1   Feb. 9, 2023

(30) Foreign Application Priority Data

Jul. 20, 2021  (KR) .................. 10-2021-0094860

(51) Int. Cl.
*B60K 1/04* (2019.01)
*B62D 25/20* (2006.01)

(52) U.S. Cl.
CPC ............ *B60K 1/04* (2013.01); *B62D 25/2018* (2013.01); *B62D 25/2027* (2013.01); *B60K 2001/0438* (2013.01)

(58) Field of Classification Search
CPC ........ B62D 25/2027; B60K 2001/0416; B60R 2021/01006
USPC ....................................................... 296/204
See application file for complete search history.

(56) References Cited

U.S. PATENT DOCUMENTS

| | | | |
|---|---|---|---|
| 8,480,165 B2 * | 7/2013 | Koyama | B62D 25/2027 296/203.04 |
| 8,528,967 B2 * | 9/2013 | Schwarz | B62D 25/2027 296/204 |
| 8,567,543 B2 * | 10/2013 | Kubota | B60L 58/26 180/68.5 |
| 8,770,656 B2 * | 7/2014 | Tabuteau | B62D 25/2027 296/204 |
| 8,841,013 B2 * | 9/2014 | Choo | B60K 1/04 429/100 |
| 9,745,001 B2 * | 8/2017 | Mildner | B60R 16/04 |
| 9,873,456 B2 * | 1/2018 | Hara | B60K 1/04 |
| 9,956,861 B2 * | 5/2018 | Nomura | B62D 23/005 |
| 9,975,416 B2 * | 5/2018 | Hara | B62D 25/20 |
| 9,987,912 B2 * | 6/2018 | Shinoda | B60K 1/04 |
| 10,358,048 B2 * | 7/2019 | Hara | H01M 50/262 |
| 10,632,847 B2 * | 4/2020 | Yokoyama | B60L 50/66 |
| 2020/0338991 A1 * | 10/2020 | Sopel | H01M 50/249 |

FOREIGN PATENT DOCUMENTS

EP    2712748 A1 *  4/2014  ............... B60K 1/04

* cited by examiner

*Primary Examiner* — Amy R Weisberg
*Assistant Examiner* — Veronica M Shull
(74) *Attorney, Agent, or Firm* — Slater Matsil, LLP

(57) ABSTRACT

An embodiment vehicle body includes a rear cross member unit disposed in a vehicle width direction and coupled to front portions of a pair of rear side members disposed at a rear portion of the vehicle body, a pair of side seal units respectively coupled to end portions of the rear cross member unit in a vehicle length direction, a front cross member unit coupled to front portions of the pair of side seal units in the vehicle width direction, an upper cross member unit coupled to upper portions of the pair of side seal units in the vehicle width direction, and a rear floor panel assembly connected to the rear cross member unit, the pair of side seal units, the front cross member unit, and the upper cross member unit.

20 Claims, 14 Drawing Sheets

VEHICLE BODY STRUCTURE

CROSS-REFERENCE TO RELATED APPLICATIONS

This application claims the benefit of Korean Patent Application No. 10-2021-0094860, filed on Jul. 20, 2021, which application is hereby incorporated herein by reference.

TECHNICAL FIELD

The present disclosure relates to a vehicle body structure.

BACKGROUND

In general, so-called environment-friendly vehicles, such as a hybrid vehicle, an electric vehicle, a hybrid electric vehicle, a fuel cell electric vehicle (also called a "hydrogen electric vehicle" in the field), are equipped with a high-voltage battery that supplies power to a drive motor.

For example, in the case of the fuel cell electric vehicle, a high-voltage battery is generally mounted on a rear floor structure at a rear portion of a vehicle body. In addition, accessory components such as an electric water pump, a cooling unit (for example, a radiator), and a hydrogen tank are mounted on the rear floor structure.

Recently, as a purpose-built vehicle, a super sports car based on the fuel cell electric vehicle has been introduced.

However, such a super sports car based on the fuel cell electric scheme has difficulty in mounting the high-voltage battery and various accessory components in the limited space of the rear vehicle body. In addition, due to a decrease in the structural rigidity, damage may be caused to the high-voltage battery in a lateral collision.

The above information disclosed in this Background section is only for enhancement of understanding of the background of the invention, and therefore it may contain information that does not form the prior art that is already known to a person of ordinary skill in the art.

SUMMARY

The present disclosure relates to a vehicle body structure. Particular embodiments relate to a rear vehicle body structure capable of protecting a high-voltage battery.

An embodiment of the present disclosure provides a vehicle body structure capable of securing a better space for mounting a high-voltage battery at a rear of a vehicle body.

A vehicle body structure according to an embodiment includes a rear cross member unit disposed in a vehicle width direction and coupled to front portions of a pair of rear side members disposed at a rear portion of the vehicle body, a pair of side sill units respectively coupled to end portions of the rear cross member unit in a vehicle length direction, a front cross member unit coupled to front portions of the pair of side sill units in the vehicle width direction, an upper cross member unit coupled to upper portions of the pair of side sill units in the vehicle width direction, and a rear floor panel assembly connected to the rear cross member unit, the pair of side sill units, the front cross member unit, and the upper cross member unit.

A battery mounting space of a dome shape may be formed in the rear floor panel assembly.

The front cross member unit may be positioned below the rear cross member unit, and the upper cross member unit may be positioned above the rear cross member unit.

A vehicle body structure according to an embodiment may further include a battery lower fixing unit provided in the rear cross member unit and the front cross member unit, and a battery upper fixing unit coupled to an inner side upper surface of the rear floor panel assembly.

The rear cross member unit may include a first rear cross member coupled to front portions of the pair of rear side members, a second rear cross member coupled to the first rear cross member to form a closed section, and at least one bulkhead coupled to at least one of the first and second rear cross members in the closed section.

The front cross member unit may include a first front cross member coupled in the vehicle width direction to a front lower portion of a first side sill unit among the pair of side sill units, a second front cross member disposed at a predetermined distance from the first front cross member, and coupled in the vehicle width direction to a front lower portion of a second side sill unit among the pair of side sill units, and an upper reinforcement member respectively coupled to upper surfaces of the first and second front cross members.

The upper cross member unit may include a first upper cross member corresponding to the first front cross member and coupled to a front upper portion of the first side sill unit in the vehicle width direction, and a second upper cross member corresponding to the second front cross member and coupled to a front upper portion of the second side sill unit in the vehicle width direction, and disposed at a predetermined distance from the first upper cross member.

The upper cross member unit may further include a third upper cross member disposed at a rear side of the first and second upper cross members, and coupled to the upper portions of the pair of side sill units, and at least one reinforcing connection member connecting the third upper cross member and the rear cross member unit in the vehicle length direction, and being coupled to the rear floor panel assembly.

Spaced-apart end portions of the first and second front cross members may be connected to each other through a tunnel member, and the tunnel member may be coupled to the rear floor panel assembly.

Spaced-apart end portions of the first and second upper cross members may be connected to each other through a tunnel reinforcement member, and the tunnel reinforcement member may be coupled to the tunnel member.

The rear floor panel assembly may include a rear floor panel connected to the rear cross member unit, the pair of side sill units, the first upper cross member, the second upper cross member, and the third upper cross member, and an intermediate panel connected to the first front cross member and the first upper cross member, connected to the second front cross member and the second upper cross member, connected to the pair of side sill units, and coupled to the rear floor panel.

Each of the pair of side sill units may include a side sill panel connected to the rear cross member unit, the front cross member unit, and the upper cross member unit, and an outer reinforcement panel coupled to an outer surface of the side sill panel.

The battery lower fixing unit may include a plurality of weld bolts provided in the rear cross member unit, and a plurality of weld nuts provided in the front cross member unit.

The rear cross member unit, the pair of side sill units, and the front cross member unit may form a battery mounting section having a rectangular shape in a horizontal cross-section.

The battery upper fixing unit may include a first mounting bracket connected to the upper cross member unit in the vehicle width direction, a second mounting bracket configured to connect the rear cross member unit and the upper cross member unit in the vehicle length direction, and a third mounting bracket disposed on an opposite side of the second mounting bracket in the vehicle width direction, and configured to connect the rear cross member unit and the upper cross member unit in the vehicle length direction.

The first mounting bracket, the second mounting bracket, and the third mounting bracket may be arranged in a triangular structure.

According to an embodiment of the present disclosure, a space for mounting a high-voltage battery may be secured in the limited space in the rear portion of the vehicle body, structural rigidity of a rear floor structure may be increased, and damage to the high-voltage battery upon a vehicle collision may be minimized.

Other effects that may be obtained or are predicted by exemplary embodiments will be explicitly or implicitly described in a detailed description of embodiments of the present invention. That is, various effects that are predicted according to exemplary embodiments will be described in the following detailed description.

BRIEF DESCRIPTION OF THE DRAWINGS

The embodiments herein may be better understood by referring to the following description in conjunction with the accompanying drawings in which like reference numerals indicate identically or functionally similar elements.

Figure 1:
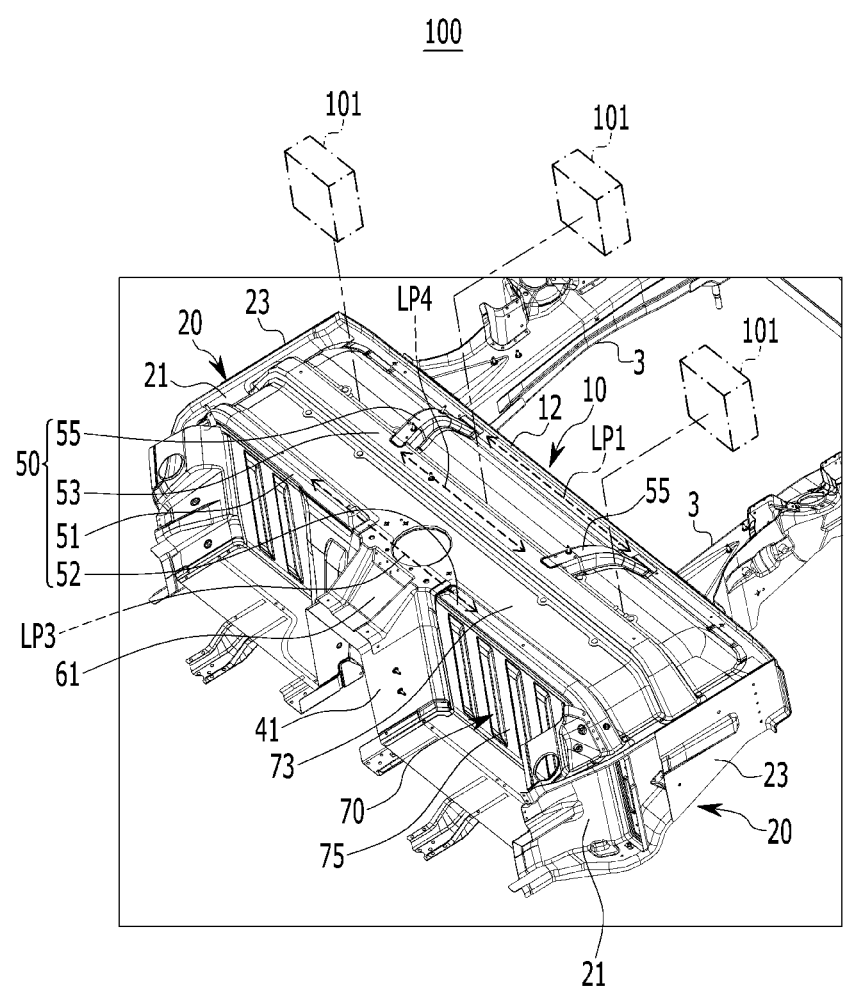
FIG. 1 to FIG. 4 are perspective views showing a vehicle body structure according to an embodiment.
Figure 2:
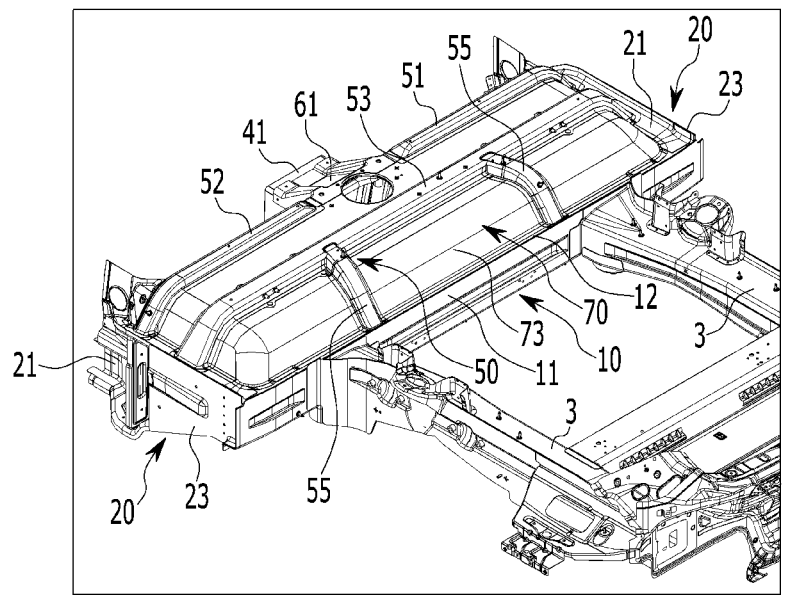
Figure 3:
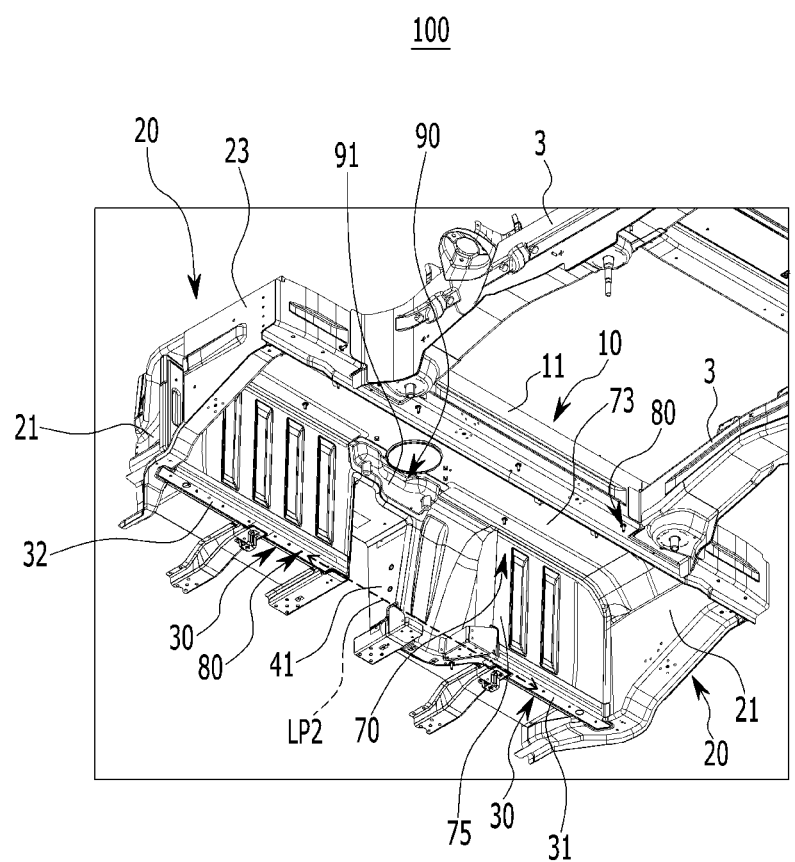
Figure 4:
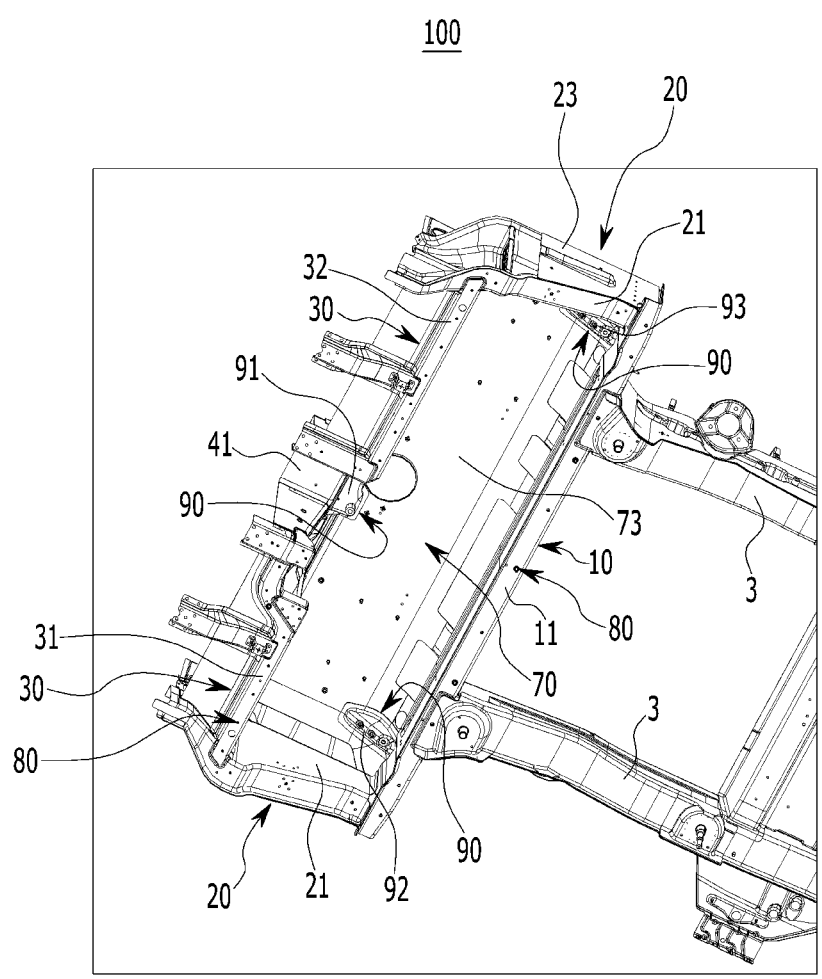

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

The following descriptions may be used in connection with the drawings to further explain embodiments of the present invention.

1: high-voltage battery
3: rear side member
5: bolt fastening portion
6: nut
7: nut fastening portion
8: bolt
10: rear cross member unit
11: first rear cross member
12: second rear cross member
13: bulkhead
15: closed section
20: side sill unit
21: side sill panel
23: outer reinforcement panel
30: front cross member unit
31: first front cross member
32: second front cross member
33: upper reinforcement member
41: tunnel member
50: upper cross member unit
51: first upper cross member
52: second upper cross member
53: third upper cross member
55: reinforcing connection member
61: tunnel reinforcement member
70: rear floor panel assembly
71: battery mounting space
73: rear floor panel
75: intermediate panel
80: battery lower fixing unit
81: weld bolt
83: weld nut
85: fastening hole
87: battery mounting section
90: battery upper fixing unit
91: first mounting bracket
92: second mounting bracket
93: third mounting bracket
LP1: first load path
LP2: second load path
LP3: third load path
LP4: fourth load path
100: vehicle body structure
101: accessory component

DETAILED DESCRIPTION OF ILLUSTRATIVE EMBODIMENTS

The terminology used herein is for the purpose of describing specific examples only and is not intended to be limiting of the disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly through one or more intermediary components.

The terms "vehicle", "of a vehicle", "automobile" or other similar terms used herein are generally used to cover various vehicles such as passenger vehicles including sports cars, spoil utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, embodiments of the present disclosure are described in detail with reference to the accompanying drawings.

Figure 5:
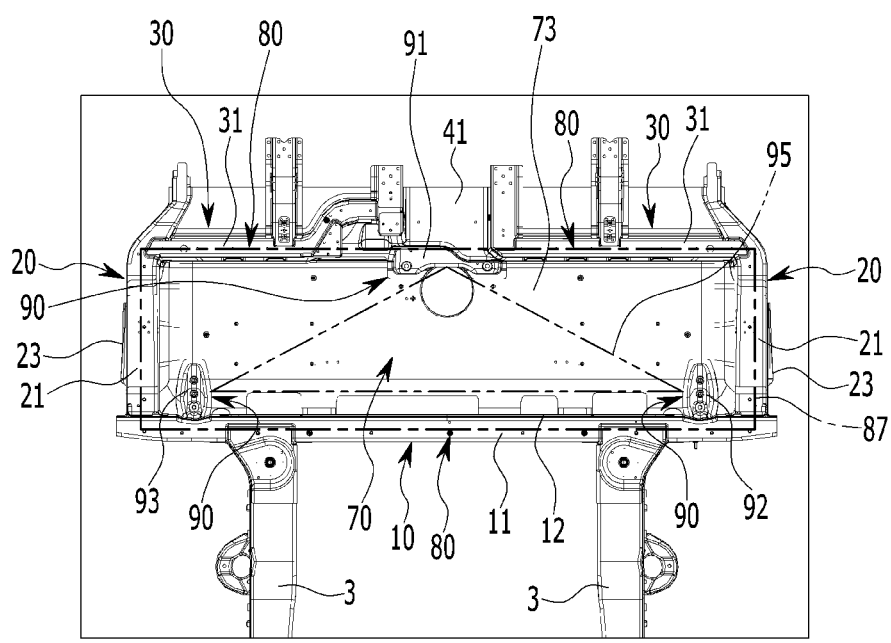
FIG. 5 is a bottom view showing a vehicle body structure according to an embodiment.
Figure 6:
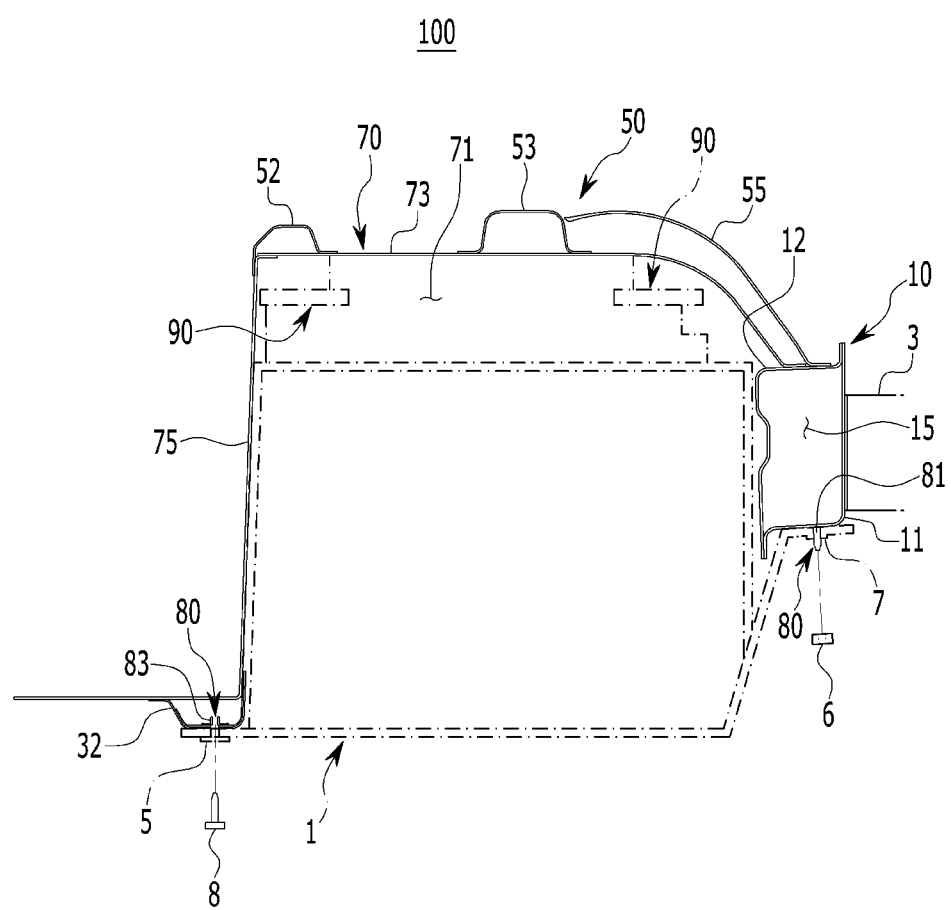
FIG. 6 is a cross-sectional view showing a vehicle body structure according to an embodiment.

FIG. 1 to FIG. 4 are perspective views showing a vehicle body structure according to an embodiment, FIG. 5 is a bottom view showing a vehicle body structure according to an embodiment, and FIG. 6 is a cross-sectional view showing a vehicle body structure according to an embodiment.

Referring to FIG. 1 to FIG. 6, a vehicle body structure 100 according to an embodiment may be applicable to a vehicle body of an electric vehicle and furthermore to a super sports car based on a hydrogen electric vehicle.

In an example, a super sports car may be formed in a two-seater type, having one row of a driver seat and a passenger seat, and may be equipped with, in a rear portion of the vehicle body, a high-voltage battery 1 (refer to FIG. 6) to supply power to a driver motor. In addition, the rear portion of the vehicle body may be configured to mount accessory components 101 such as an electric water pump, a radiator, and a hydrogen tank.

It may be understood that a super sports car based on a hydrogen electric vehicle equipped with the high-voltage battery 1 is a mere example, and the scope of the present disclosure is not limited thereto.

Embodiments of the present disclosure may be applied to a vehicle body of a general environment-friendly vehicle, such as a hybrid vehicle, an electric vehicle, a hybrid electric vehicle, or a hydrogen electric vehicle (e.g., a fuel cell electric vehicle), equipped with the high-voltage battery 1.

In this specification, the term "vehicle length direction" may refer to a length direction of the vehicle body, the term "vehicle width direction" may refer to a transverse direction of the vehicle body, and the term "vertical direction" may refer to a height direction of the vehicle body.

In addition, in this specification, the term "inner surface" of a component may refer to a surface facing an interior space (e.g., a cabin space) formed by the component, and the term "outer surface" may refer to a surface of the component opposite to the inner surface. Alternatively, the term "inner surface" of a component may refer to a surface of one component facing another component spaced apart but facing the one component, and the term "outer surface" of a component may refer to a surface of one component facing opposite of another component.

Furthermore, in this specification, "upper end portion", "upper portion", "upper end", or "upper portion surface" of a component indicates an end portion, portion, end, or surface of the component that is relatively positioned higher in the drawing, and "lower end portion", "lower portion", "lower end", or "lower portion surface" of a component indicates an end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

Meanwhile, the vehicle body structure 100 according to an embodiment may be applied, in particular, to a rear floor structure of the rear portion of the vehicle body capable of mounting the high-voltage battery 1 and the various accessory components 101.

As described above, the vehicle body structure 100 according to embodiments of the present invention may provide a rear follower structure capable of securing a space for mounting the high-voltage battery 1 in a limited space at the rear portion of the vehicle body.

In addition, the vehicle body structure 100 according to an embodiment provides the rear floor structure capable of increasing the structural rigidity of the rear portion of the vehicle body, and protecting the high-voltage battery 1 against a vehicle collision.

To this end, the vehicle body structure 100 according to an embodiment basically includes a rear cross member unit 10, a pair of side sill units 20, a front cross member unit 30, an upper cross member unit 50, a rear floor panel assembly 70, a battery lower fixing unit 80, and a battery upper fixing unit 90.

In an embodiment, the rear cross member unit 10 is disposed in the vehicle width direction and coupled to front portions of a pair of rear side members 3 disposed in the vehicle length direction at the rear portion of the vehicle body.

Figure 7A:
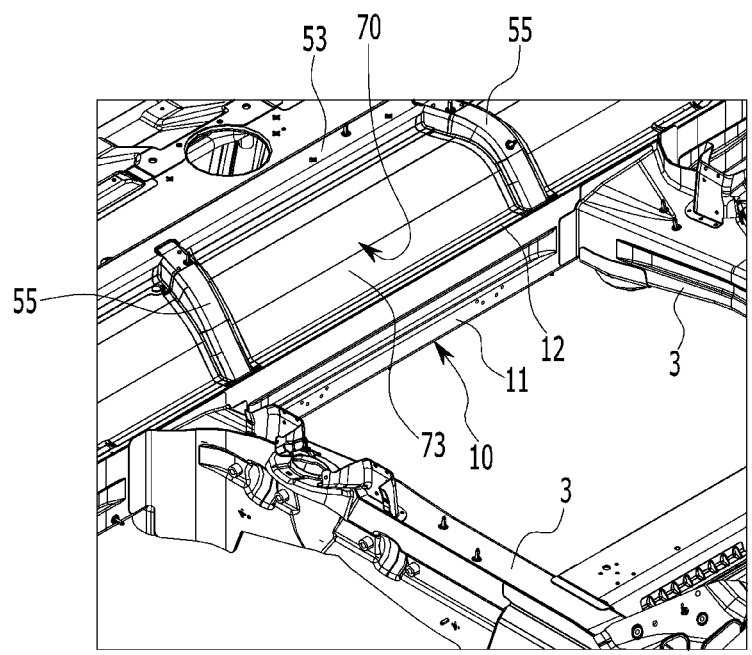
FIG. 7A and FIG. 7B show a rear cross member unit applied to a vehicle body structure according to an embodiment.
Figure 7B:
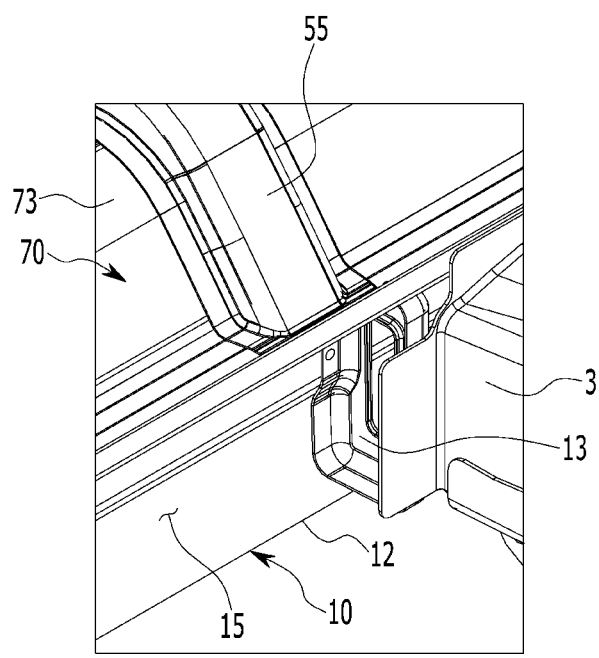

As shown in FIG. 7A and FIG. 7B, the rear cross member unit 10 includes a first rear cross member 11, a second rear cross member 12, and at least one bulkhead 13.

The first rear cross member 11 is disposed in the vehicle width direction, and coupled to the front portions of the pair of rear side members 3. The first rear cross member 11 may be formed in a bent cross-section having a preset shape.

The second rear cross member 12 is disposed in the vehicle width direction in front of the first rear cross member 11, and is coupled to the first rear cross member 11. The second rear cross member 12 may be formed in a bent cross-section having a preset shape.

A closed section 15 corresponding to the bent cross-section is formed between the first and second rear cross members 11 and 12.

Here, by the first and second rear cross members 11 and 12, a first load path LP1 connected to a pair of side sill units 20 is formed in the vehicle width direction.

In order to reinforce rigidity of the rear cross member unit 10, the at least one bulkhead 13 is coupled to the first and second rear cross members 11 and 12, in the closed section 15 formed by the first and second rear cross members 11 and 12. For example, the bulkhead 13 may be provided in a plural quantity, and a plurality of bulkheads 13 may be disposed apart from each other along the vehicle width direction, in the closed section 15.

In an embodiment, a side portion of the rear floor structure is formed by the pair of side sill units 20. The pair of side sill units 20 are respectively coupled to both end portions of the rear cross member unit 10 in the vehicle length direction.

In this disclosure, the pair of side sill units 20 includes a first side sill unit 20 corresponding to a first side (e.g., left side) of the rear cross member unit 10 and a second side sill unit 20 corresponding to a second side (e.g., right side) of the rear cross member unit 10. The pair of side sill units 20 are disposed to face each other in the vehicle width direction.

Each of the pair of side sill units 20 includes at least one side sill panel 21 and at least one outer reinforcement panel 23.

The side sill panel 21 is connected to both sides of the rear cross member unit 10. The outer reinforcement panel 23 is coupled to an outer surface of the side sill panel 21.

In an embodiment, the front cross member unit 30 is disposed on a front side of the rear cross member unit 10, and coupled to front portions of the pair of side sill units 20 in the vehicle width direction. In an example, the front cross member unit 30 may be positioned below the rear cross member unit 10.

Figure 8:
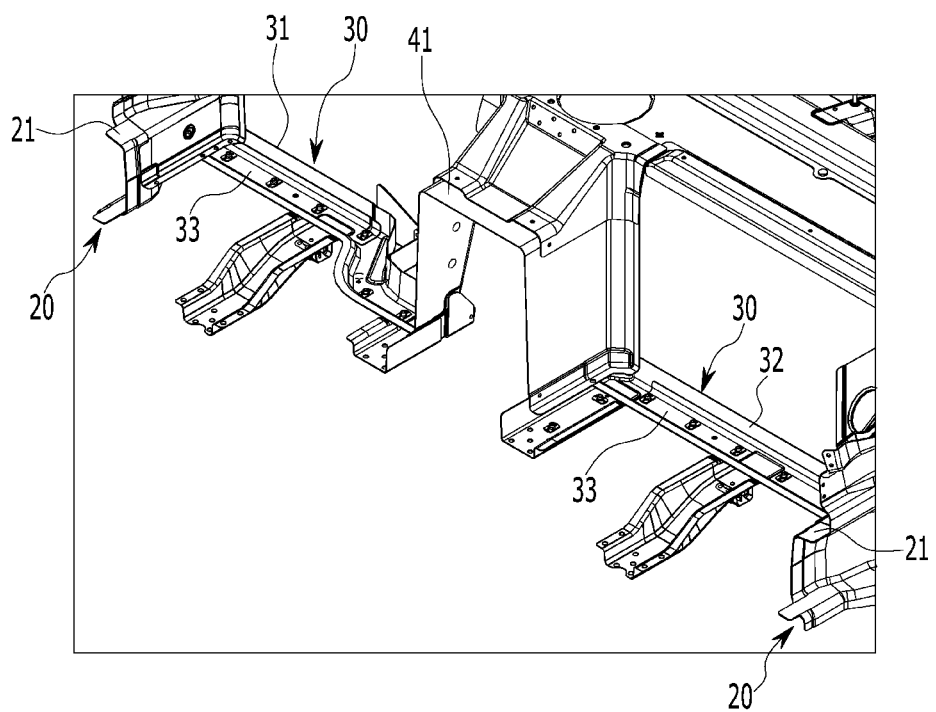
FIG. 8 shows a front cross member unit applied to a vehicle body structure according to an embodiment.

The front cross member unit 30 includes a first front cross member 31, a second front cross member 32, and at least one upper reinforcement member 33 (shown in FIG. 8).

The first front cross member 31 is coupled to a front lower portion of the first side sill unit 20 in the vehicle width direction. The first front cross member 31 is connected to an inner surface of the side sill panel 21 in the first side sill unit 20.

The second front cross member 32 is coupled to a front lower portion of the second side sill unit 20 in the vehicle width direction, at a predetermined distance from the first front cross member 31. The second front cross member 32 is connected to the inner surface of the side sill panel 21 in the second side sill unit 20.

Here, spaced-apart end portions, corresponding to each other, of the first and second front cross members 31 and 32 may be connected to each other through a tunnel member 41.

The tunnel member 41 is disposed between the spaced-apart end portions of the first and second front cross members 31 and 32, connects a second load path LP2 of the first and second front cross members 31 and 32, and allows components such as a wire connected to the high-voltage battery 1 to pass through.

The upper reinforcement member 33 is configured to reinforce rigidity of the front cross member unit 30. The upper reinforcement member 33 is respectively coupled to upper surfaces of the first and second front cross members 31 and 32.

In an embodiment, the upper cross member unit 50 is coupled to upper portions of the pair of side sill units 20 in the vehicle width direction. The upper cross member unit 50 may be positioned above the rear cross member unit 10.

The upper cross member unit 50 includes a first upper cross member 51, a second upper cross member 52, a third upper cross member 53, and at least one reinforcing connection member 55.

The first upper cross member 51 corresponds to the first front cross member 31 and is coupled to a front upper portion of the first side sill unit 20 in the vehicle width direction. The first upper cross member 51 is connected to an upper surface of the side sill panel 21 in the first side sill unit 20.

The second upper cross member 52 corresponds to the second front cross member 32 and is coupled to a front upper portion of the second side sill unit 20 in the vehicle width direction. The second upper cross member 52 is connected to the upper surface of the side sill panel 21 in the second side sill unit 20. The second upper cross member 52 is disposed at a predetermined distance from the first upper cross member 51.

Here, spaced-apart end portions, corresponding to each other, of the first and second upper cross members 51 and 52 may be connected to each other through a tunnel reinforcement member 61. The tunnel reinforcement member 61 is coupled to an upper surface of the tunnel member 41.

The tunnel reinforcement member 61 is disposed between the first and second upper cross members 51 and 52, and is configured to connect a third load path LP3 of the first and second upper cross members 51 and 52 and reinforce rigidity of the tunnel member 41.

The third upper cross member 53 is disposed in the vehicle width direction at a rear side of the first and second upper cross members 51 and 52, and is coupled to the upper portions of the pair of side sill units 20.

Here, the third upper cross member 53 is configured to form a fourth load path LP4 connecting the upper portion of the first side sill unit 20 and the upper portion of the second side sill unit 20.

The reinforcing connection member 55 is configured to connect the third upper cross member 53 and the rear cross member unit 10 in the vehicle length direction, and reinforce rigidity of the third upper cross member 53 and the rear cross member unit 10.

The reinforcing connection member 55 is connected to the third upper cross member 53 and the second rear cross member 12 of the rear cross member unit 10. In an example, a plurality of reinforcing connection members 55 are provided, and the plurality of reinforcing connection members 55 may be disposed to be spaced apart from each other by a preset interval along the vehicle width direction.

In an embodiment, the rear floor panel assembly 70 is configured to form the rear floor structure in the rear portion of the vehicle body.

The rear floor panel assembly 70 is connected to the rear cross member unit 10, the pair of side sill units 20, the front cross member unit 30, and the upper cross member unit 50.

Furthermore, the rear floor panel assembly 70 may be connected to an upper surface of the second rear cross member 12, the upper surfaces of the first and second front cross members 31 and 32, the upper surface and the inner surface of the side sill panel 21, and lower surfaces of the first, second, and third upper cross members 51, 52, and 53.

In the rear floor panel assembly 70, the rear cross member unit 10, the pair of side sill units 20, the front cross member unit 30, and the upper cross member unit 50 may form a battery mounting space 71 of a dome shape, in a vertical cross-section (refer to FIG. 6).

The rear floor panel assembly 70 includes at least one rear floor panel 73 and at least one intermediate panel 75.

The rear floor panel 73 is connected to the upper surface of the second rear cross member 12, the upper surface of the side sill panel 21, and the lower surfaces of the first, second, and third upper cross members 51, 52, and 53.

Furthermore, the rear floor panel 73 may be connected to a lower surface of the reinforcing connection member 55, and connected to the tunnel reinforcement member 61.

The intermediate panel 75 is configured to connect the rear floor panel 73 and a front floor structure (not shown) in the front portion of the vehicle body.

The intermediate panel 75 is connected to an upper surface of the first front cross member 31 and a lower surface of the first upper cross member 51 that correspond to each other. The intermediate panel 75 is connected to an upper surface of the second front cross member 32 and a lower surface of the second upper cross member 52 that correspond to each other.

In addition, the intermediate panel 75 is connected to the inner surface of the side sill panel 21, and is coupled to the rear floor panel 73. Furthermore, the intermediate panel 75 may be connected to the tunnel member 41 and the tunnel reinforcement member 61.

In an embodiment, the battery lower fixing unit 80 is configured to fix a lower portion of the high-voltage battery 1 disposed in the battery mounting space 71 of the rear floor panel assembly 70 to the rear cross member unit 10 and the front cross member unit 30.

Figure 9A:
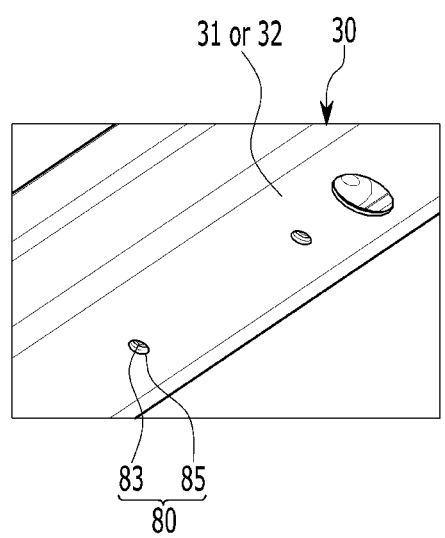
FIG. 9A and FIG. 9B show a battery lower fixing unit applied to a vehicle body structure according to an embodiment.
Figure 9B:
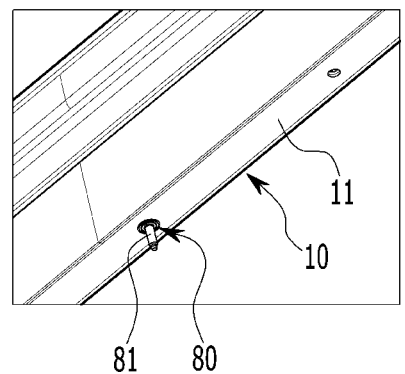

The battery lower fixing unit 80 is provided in the rear cross member unit 10 and the front cross member unit 30. As shown in FIG. 9A and FIG. 9B, the battery lower fixing unit 80 includes a plurality of weld bolts 81 and a plurality of weld nuts 83.

The plurality of weld bolts 81 are provided on a lower surface of the first rear cross member 11 of the rear cross member unit 10. The plurality of weld bolts 81 is coupled to the lower surface of the first rear cross member 11 (for example, welding coupled), and vertically extends at the lower surface.

The plurality of weld bolts 81 may be inserted into a plurality of bolt fastening portions 5 (refer to FIG. 6) provided in the high-voltage battery 1, and may be engaged with a plurality of nuts 6.

The plurality of weld nuts 83 are provided on the lower surfaces of the first and second front cross members 31 and 32 of the front cross member unit 30.

The plurality of weld nuts 83 are coupled to interior surfaces of the first and second front cross members 31 and 32 (for example, welding coupled), and are connected to a plurality of fastening holes 85 formed in the lower surfaces of the first and second front cross members 31 and 32.

The plurality of weld nuts 83 may be inserted into a plurality of nut fastening portions 7 (refer to FIG. 6) provided in the high-voltage battery 1, and may be engaged with a plurality of bolts 8.

Here, the first rear cross member 11, the pair of side sill units 20, and the first and second front cross members 31 and 32 may form a battery mounting section 87 having a rectangular shape in a horizontal cross-section (i.e., having the rectangular shape when projected onto a horizontal surface), where the high-voltage battery 1 may be mounted through the plurality of weld bolts 81 and the plurality of weld nuts 83 (refer to FIG. 5).

In an embodiment, the battery upper fixing unit 90 is configured to fix the upper portion of the high-voltage battery 1 disposed in the battery mounting space 71 of the rear floor panel assembly 70 to the upper cross member unit 50.

Figure 10A:
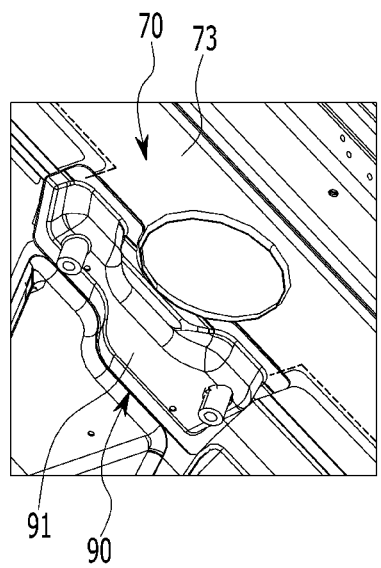
FIG. 10A, FIG. 10B, and FIG. 10C show a battery upper fixing unit applied to a vehicle body structure according to an embodiment.
Figure 10B:
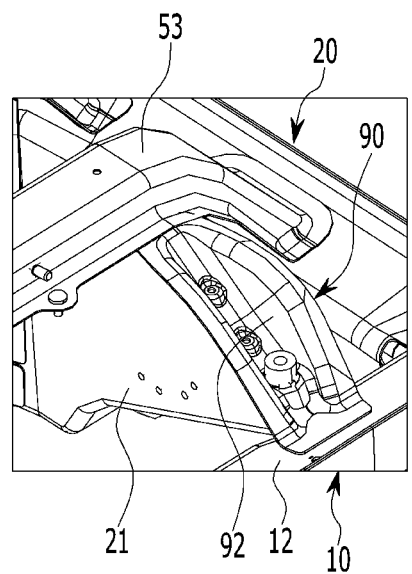
Figure 10C:
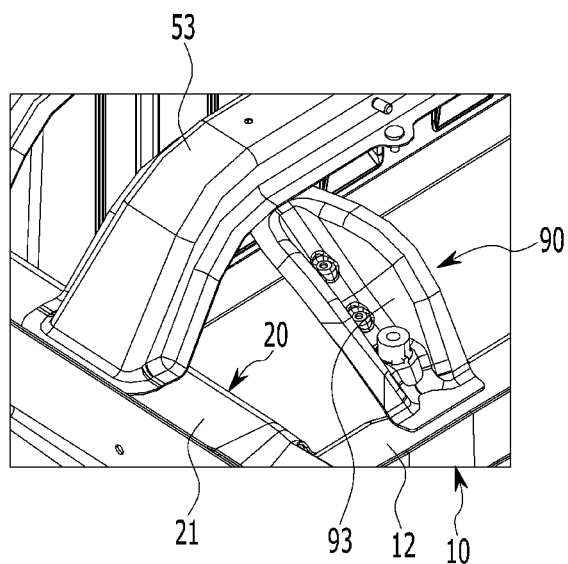

The battery upper fixing unit 90 is coupled to an inner side upper surface of the rear floor panel assembly 70. Here, the inner side refers to an interior region of the rear floor panel assembly 70 that is open downward. As shown in FIG. 10A, FIG. 10B, and FIG. 10C, the battery upper fixing unit 90 includes a first mounting bracket 91, a second mounting bracket 92, and a third mounting bracket 93.

The first mounting bracket 91 is configured to fix the upper portion of the high-voltage battery 1 to the upper cross member unit 50.

The first mounting bracket 91 is connected to the upper cross member unit 50 in the vehicle width direction. The first mounting bracket 91 may be coupled to a lower surface of the rear floor panel 73, and may be connected to the spaced-apart end portions of the first and second upper cross members 51 and 52 (refer to FIG. 10A).

The second mounting bracket 92 is configured to fix another side of the upper portion of the high-voltage battery 1 to the rear cross member unit 10 and the upper cross member unit 50.

The second mounting bracket 92 connects the rear cross member unit 10 and the upper cross member unit 50 in the vehicle length direction. The second mounting bracket 92 may be coupled to the lower surface of the rear floor panel 73, and may be connected to the second rear cross member 12 and the third upper cross member 53 through both end portions (refer to FIG. 10B).

In addition, the third mounting bracket 93 is configured to fix still another side of the upper portion of the high-voltage battery 1 to the rear cross member unit 10 and the upper cross member unit 50.

In addition, the third mounting bracket 93 connects the rear cross member unit 10 and the upper cross member unit 50 in the vehicle length direction. The third mounting bracket 93 may be coupled to the lower surface of the rear floor panel 73, and may be connected to the second rear cross member 12 and the third upper cross member 53 through both end portions (refer to FIG. 10C). Here, the second mounting bracket 92 and the third mounting bracket 93 are disposed opposite to each other in the vehicle width direction, and may secure connection rigidity of the rear cross member unit 10 and the upper cross member unit 50.

Here, the first mounting bracket 91, the second mounting bracket 92, and the third mounting bracket 93 of the battery upper fixing unit 90 may be arranged in a triangular structure 95 when viewed from below of the rear floor panel assembly 70.

Hereinafter, an operation of the vehicle body structure 100 according to an embodiment is described in detail with reference to FIG. 1 to FIG. 10C.

First, the rear floor panel assembly 70 is connected to the rear cross member unit 10, the pair of side sill units 20, the front cross member unit 30, and the upper cross member unit 50 and forms in the battery mounting space 71 in the dome shape.

The first and second rear cross members 11 and 12 of the rear cross member unit 10 are connected to the pair of side sill units 20, and form the first load path LP1 in the vehicle width direction.

The first and second front cross members 31 and 32 of the front cross member unit 30 are connected to the pair of side sill units 20 and the tunnel member 41 and form the second load path LP2 in the vehicle width direction.

In addition, the upper reinforcement member 33 is coupled to the upper surfaces of the first and second front cross members 31 and 32, and reinforces rigidity of the first and second front cross members 31 and 32.

The first and second upper cross members 51 and 52 of the upper cross member unit 50 are connected to the pair of side sill units 20 and the tunnel reinforcement member 61 and form the third load path LP3 in the vehicle width direction. The third upper cross member 53 of the upper cross member unit 50 is connected to the pair of side sill units 20 and forms the fourth load path LP4 in the vehicle width direction.

The tunnel reinforcement member 61 reinforces rigidity of the first and second upper cross members 51 and 52, and rigidity of the tunnel member 41 coupled to the rear floor panel assembly 70.

Furthermore, the third upper cross member 53 and the second rear cross member 12 are connected in the vehicle length direction by the reinforcing connection member 55. The reinforcing connection member 55 reinforces rigidity of the third upper cross member 53 and the second rear cross member 12.

Meanwhile, the high-voltage battery 1 may be mounted to the battery mounting space 71 of the rear floor panel assembly 70 by the battery lower fixing unit 80 and the battery upper fixing unit 90.

The lower portion of the high-voltage battery 1 may be fixed to the rear cross member unit 10 and the front cross member unit 30 by the battery lower fixing unit 80. The lower portion of the high-voltage battery 1 may be engaged with the plurality of weld bolts 81 provided on the lower surface of the first rear cross member 11. In addition, the lower portion of the high-voltage battery 1 may be engaged with the plurality of weld nuts 83 provided on the lower surfaces of the first and second front cross members 31 and 32.

Here, the lower portion of the high-voltage battery 1 may be engaged with the plurality of weld bolts 81 and the plurality of weld nuts 83 in the battery mounting section 87 of the rectangular shape defined by the first rear cross member 11, the pair of side sill units 20, and the first and second front cross members 31 and 32.

Furthermore, the upper portion of the high-voltage battery 1 is fixed to the rear cross member unit 10 and the upper cross member unit 50 by the battery upper fixing unit 90 through the inner side upper surface of the rear floor panel assembly 70.

The upper portion of the high-voltage battery 1 may be engaged with the first, second, and third mounting brackets 91, 92, and 93 connected to the second rear cross member 12 and the first, second, and third upper cross members 51, 52, and 53.

The first, second, and third mounting brackets 91, 92, and 93 are disposed with a triangular structure 95, to fix the upper portion of the high-voltage battery 1 and reinforce rigidity of the rear cross member unit 10 and the upper cross member unit 50.

On the other hand, the accessory components 101 such as an electric water pump, a radiator, and a hydrogen tank are mounted on an upper surface of the upper cross member unit 50 and the upper surface of the rear floor panel assembly 70.

Therefore, the vehicle body structure 100 according to an embodiment is capable of securing a space for mounting the high-voltage battery 1 in the limited space of the rear floor structure in the rear portion of the vehicle body.

In addition, the vehicle body structure 100 according to an embodiment may increase structural rigidity of the rear floor structure, reinforce the connection properties of members, and suppress torsional deformation of the rear floor structure.

Furthermore, upon a lateral collision of the vehicle, the vehicle body structure 100 according to an embodiment may disperse the collision impact through the first, second, third, and fourth load paths LP1, LP2, LP3, and LP4.

Accordingly, in an embodiment, it is possible to minimize the damage of the high-voltage battery 1 and the injury of the occupant due to torsional deformation of the pair of side seal units 20 during the lateral collision of the vehicle.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body comprising:
    a rear cross member unit disposed in a vehicle width direction and coupled to end portions of a pair of rear side members disposed at a rear portion of the vehicle body;
    a pair of side sill units respectively coupled to end portions of the rear cross member unit in a vehicle length direction;
    a front cross member unit coupled to front portions of the pair of side sill units in the vehicle width direction, wherein the front cross member unit is positioned below the rear cross member unit;
    an upper cross member unit coupled to upper portions of the pair of side sill units in the vehicle width direction, wherein the upper cross member unit is positioned above the rear cross member unit; and
    a rear floor panel assembly connected to the rear cross member unit, the pair of side sill units, the front cross member unit, and the upper cross member unit.

2. The vehicle body of claim 1, further comprising a battery mounting space of a dome shape in the rear floor panel assembly.

3. The vehicle body of claim 1, wherein each of the pair of side sill units comprises:
    a side sill panel connected to the rear cross member unit, the front cross member unit, and the upper cross member unit; and
    an outer reinforcement panel coupled to an outer surface of the side sill panel.

4. The vehicle body of claim 1, wherein the rear cross member unit comprises:
    a first rear cross member coupled to front portions of the pair of rear side members;
    a second rear cross member coupled to the first rear cross member to form a closed section; and
    at least one bulkhead coupled to the first rear cross member or the second rear cross member in the closed section.

5. A vehicle body comprising:
    a rear cross member unit disposed in a vehicle width direction and coupled to end portions of a pair of rear side members disposed at a rear portion of the vehicle body;
    a pair of side sill units respectively coupled to end portions of the rear cross member unit in a vehicle length direction;
    a front cross member unit coupled to front portions of the pair of side sill units in the vehicle width direction, the front cross member unit comprising:
        a first front cross member coupled in the vehicle width direction to a front lower portion of a first side sill unit of the pair of side sill units;
        a second front cross member disposed at a predetermined distance from the first front cross member and coupled in the vehicle width direction to a front lower portion of a second side sill unit of the pair of side sill units; and
    an upper reinforcement member respectively coupled to upper surfaces of the first and second front cross members; an upper cross member unit coupled to upper portions of the pair of side sill units in the vehicle width direction; and
    a rear floor panel assembly connected to the rear cross member unit, the pair of side sill units, the front cross member unit, and the upper cross member unit.

6. The vehicle body of claim 5, wherein the upper cross member unit comprises:
    a first upper cross member corresponding to the first front cross member and coupled to a front upper portion of the first side sill unit in the vehicle width direction; and
    a second upper cross member corresponding to the second front cross member and coupled to a front upper portion of the second side sill unit in the vehicle width direction and disposed at a predetermined distance from the first upper cross member.

7. The vehicle body of claim 6, wherein the upper cross member unit further comprises:
    a third upper cross member disposed at a rear side of the first and second upper cross members and coupled to the upper portions of the pair of side sill units; and
    at least one reinforcing connection member connecting the third upper cross member and the rear cross member unit in the vehicle length direction and being coupled to the rear floor panel assembly.

8. The vehicle body of claim 7, wherein the rear floor panel assembly comprises:
    a rear floor panel connected to the rear cross member unit, the pair of side sill units, the first upper cross member, the second upper cross member, and the third upper cross member; and an intermediate panel connected to the first front cross member and the first upper cross member, connected to the second front cross member and the second upper cross member, connected to the pair of side sill units, and coupled to the rear floor panel.

9. The vehicle body of claim 6, wherein:
spaced-apart end portions of the first and second front cross members are connected to each other through a tunnel member; and
the tunnel member is coupled to the rear floor panel assembly.

10. The vehicle body of claim 9, wherein:
spaced-apart end portions of the first and second upper cross members are connected to each other through a tunnel reinforcement member; and
the tunnel reinforcement member is coupled to the tunnel member.

11. The vehicle body of claim 6, further comprising a battery mounting space of a dome shape in the rear floor panel assembly.

12. The vehicle body of claim 6, wherein:
the front cross member unit is positioned below the rear cross member unit; and
the upper cross member unit is positioned above the rear cross member unit.

13. A vehicle body comprising:
a rear cross member unit disposed in a vehicle width direction and coupled to front end portions of a pair of rear side members disposed at a rear portion of the vehicle body;
a pair of side sill units respectively coupled to end portions of the rear cross member unit in a vehicle length direction;
a front cross member unit coupled to front portions of the pair of side sill units in the vehicle width direction;
an upper cross member unit coupled to upper portions of the pair of side sill units in the vehicle width direction;
a rear floor panel assembly connected to the rear cross member unit, the pair of side sill units, the front cross member unit, and the upper cross member unit;
a battery lower fixing unit provided in the rear cross member unit and the front cross member unit; and
a battery upper fixing unit coupled to an inner side upper surface of the rear floor panel assembly.

14. The vehicle body of claim 13, wherein the battery lower fixing unit comprises:
a plurality of weld bolts provided in the rear cross member unit; and
a plurality of weld nuts provided in the front cross member unit.

15. The vehicle body of claim 14, wherein the rear cross member unit, the pair of side sill units, and the front cross member unit form a battery mounting section having a rectangular shape in a horizontal cross-section.

16. The vehicle body of claim 13, wherein the battery upper fixing unit comprises:
a first mounting bracket connected to the upper cross member unit in the vehicle width direction;
a second mounting bracket connecting the rear cross member unit and the upper cross member unit in the vehicle length direction; and
a third mounting bracket disposed on an opposite side of the second mounting bracket in the vehicle width direction and connecting the rear cross member unit and the upper cross member unit in the vehicle length direction.

17. The vehicle body of claim 16, wherein the first mounting bracket, the second mounting bracket, and the third mounting bracket are arranged in a triangular structure.

18. The vehicle body of claim 13, wherein the upper cross member unit comprises:
a first upper cross member corresponding to a first front cross member and coupled to a front upper portion of a first side sill unit of the pair of side sill units in the vehicle width direction;
a second upper cross member corresponding to a second front cross member and coupled to a front upper portion of a second side sill unit of the pair of side sill units in the vehicle width direction and disposed at a predetermined distance from the first upper cross member;
a third upper cross member disposed at a rear side of the first and second upper cross members and coupled to the upper portions of the pair of side sill units; and
at least one reinforcing connection member connecting the third upper cross member and the rear cross member unit in the vehicle length direction and being coupled to the rear floor panel assembly.

19. The vehicle body of claim 18, wherein the rear floor panel assembly comprises:
a rear floor panel connected to the rear cross member unit, the pair of side sill units, the first upper cross member, the second upper cross member, and the third upper cross member; and
an intermediate panel connected to the first front cross member and the first upper cross member, connected to the second front cross member and the second upper cross member, connected to the pair of side sill units, and coupled to the rear floor panel.

20. The vehicle body of claim 13, wherein:
the front cross member unit is positioned below the rear cross member unit; and
the upper cross member unit is positioned above the rear cross member unit.

* * * * *

UNITED STATES PATENT AND TRADEMARK OFFICE
CERTIFICATE OF CORRECTION

| | |
|---|---|
| PATENT NO. | : 12,024,008 B2 |
| APPLICATION NO. | : 17/643332 |
| DATED | : July 2, 2024 |
| INVENTOR(S) | : Byeongdo An |

Page 1 of 1

It is certified that error appears in the above-identified patent and that said Letters Patent is hereby corrected as shown below:

In the Claims

In Column 13, in Claim 13, Line 29, after "coupled to" delete "front".

Signed and Sealed this
Sixth Day of August, 2024

Katherine Kelly Vidal
Director of the United States Patent and Trademark Office